(12) United States Patent
Maehara et al.

(10) Patent No.: US 8,788,095 B2
(45) Date of Patent: Jul. 22, 2014

(54) OBJECT GRASPING CONTROL METHOD AND APPARATUS

(75) Inventors: Keisuke Maehara, Kawasaki (JP); Hiroshi Miyagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 12/892,748

(22) Filed: Sep. 28, 2010

(65) Prior Publication Data

US 2011/0074171 A1  Mar. 31, 2011

(30) Foreign Application Priority Data

Sep. 29, 2009 (JP) ................................ 2009-223792

(51) Int. Cl.
*G05B 15/00* (2006.01)
*G05B 19/00* (2006.01)

(52) U.S. Cl.
USPC ........................................................ 700/258

(58) Field of Classification Search
CPC ............................... B25J 13/08; B25J 9/1697
USPC ................................................ 700/245–264
See application file for complete search history.

(56) References Cited

U.S. PATENT DOCUMENTS

| | | | | |
|---|---|---|---|---|
| 4,412,293 A * | 10/1983 | Kelley et al. | ................... | 700/259 |
| 4,985,846 A * | 1/1991 | Fallon | ........................... | 382/153 |
| 5,350,269 A * | 9/1994 | Azuma et al. | ............. | 414/416.08 |
| 5,513,299 A * | 4/1996 | Terasaki et al. | ............... | 700/255 |
| 6,845,296 B2 * | 1/2005 | Ban et al. | ...................... | 700/245 |
| 7,123,992 B2 * | 10/2006 | Ban et al. | ...................... | 700/258 |
| 7,203,573 B2 * | 4/2007 | Ban et al. | ...................... | 700/258 |
| 7,313,464 B1 * | 12/2007 | Perreault et al. | ............... | 700/245 |
| 7,474,939 B2 * | 1/2009 | Oda et al. | ...................... | 700/245 |
| 7,966,094 B2 * | 6/2011 | Ban et al. | ...................... | 700/260 |
| 7,996,114 B2 * | 8/2011 | Ban et al. | ...................... | 700/259 |
| 8,234,011 B2 * | 7/2012 | Nakajima et al. | ............. | 700/259 |
| 2006/0104788 A1 * | 5/2006 | Ban et al. | ...................... | 414/729 |
| 2008/0082213 A1 * | 4/2008 | Ban et al. | ...................... | 700/260 |
| 2009/0116728 A1 * | 5/2009 | Agrawal et al. | ............... | 382/154 |

FOREIGN PATENT DOCUMENTS

| | | | |
|---|---|---|---|
| JP | 4-146090 A | | 5/1992 |
| JP | 05-169377 A | | 7/1993 |
| JP | 05-228780 A | | 9/1993 |
| JP | 11-175117 A | | 7/1999 |
| JP | 2002-331480 A | | 11/2002 |
| JP | 2005-169564 | * | 11/2003 |

* cited by examiner

*Primary Examiner* — Khoi Tran
*Assistant Examiner* — Harry Oh
(74) *Attorney, Agent, or Firm* — Canon USA, Inc., IP Division

(57) ABSTRACT

An object grasping control method, in which an object grasping control apparatus grasps a plurality of graspable members using a grasping unit, includes recognizing at least one of a shape, position, and attitude of each of the plurality of graspable members, setting, based on at least of one of the shape, position, and attitude of each of the plurality of graspable members, an attitude range as a graspable attitude range in which each of the plurality of graspable members and the grasping unit do not interfere with each other for each of the plurality of graspable members, and setting, as a grasping target to be grasped by the grasping unit, a graspable member, among the plurality of graspable members, the set graspable attitude range of which is greater than a predetermined threshold value.

17 Claims, 29 Drawing Sheets

DISTANCE BETWEEN CENTERS $L(i_1, j_1), (i_2, j_1)$

DISTANCE BETWEEN CENTERS $L(i_1, j_1), (i_2, j_1)$

OBJECT GRASPING CONTROL METHOD AND APPARATUS

BACKGROUND OF THE INVENTION

1. Field of the Invention

The present invention relates to an object grasping control method and apparatus for setting an order of grasping each of a plurality of graspable members.

2. Description of the Related Art

Conventionally, when an operator uses a manipulator having a grasping unit to grasp and transfer a plurality of randomly placed graspable members, the operator determines an order of grasping the graspable members and instructs the manipulator thereof.

In contrast, Japanese Patent Application Laid-Open No. 4-146090 discusses calculating a mean gravity center position which is a mean value of the gravity center positions of the graspable members. A distance between the gravity center position of each graspable member and the mean gravity center position is then defined as a degree of dispersion of each graspable member, and the order of grasping is autonomously determined by using the degree of dispersion as an index.

More specifically, if there is one graspable member having a maximum degree of dispersion, such a graspable member is grasped after checking whether the graspable member can be grasped at a preset stable grasping position. Further, if there is a plurality of graspable members having the maximum degree of dispersion, the manipulability measure of a manipulator for grasping each of the graspable members is calculated. The grasping is performed after checking whether the graspable member with respect to which the manipulability measure of the manipulator becomes greatest can be grasped at the preset stable grasping position. As a result, a robot can autonomously determine the order of grasping.

When the grasping unit is to grasp a graspable member from among a plurality of randomly placed graspable members, the grasping unit may interfere with (i.e., contact) another graspable member placed around the graspable member, due to a positioning deviation of the grasping unit. To prevent such occurrence of interference, it is desirable for the grasping unit to grasp and transfer the graspable members in an order, starting with the graspable member whose surrounding is clear. However, according to the conventional technique, the order of grasping is determined according to the relation between the gravity center positions of the graspable members or the manipulability measure of the manipulator. The grasping unit may thus not grasp and transfer the graspable members in the order starting with the graspable member whose surrounding is clear.

SUMMARY OF THE INVENTION

The present invention is directed to an object grasping control method and apparatus for autonomously setting the grasping order so that the grasping is started with a graspable member whose surroundings is clear.

According to an aspect of the present invention, an object grasping control method, in which an object grasping control apparatus grasps a plurality of graspable members using a grasping unit, includes recognizing at least one of a shape, position, and attitude of each of the plurality of graspable members, setting, based on at least one of the shape, position, and attitude of each of the plurality of graspable members, an attitude range as a graspable attitude range in which each of the plurality of graspable members and the grasping unit do not interfere with each other for each of the plurality of graspable members, and setting, as a grasping target to be grasped by the grasping unit, a graspable member, among the plurality of graspable members, the set graspable attitude range of which is greater than a predetermined threshold value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
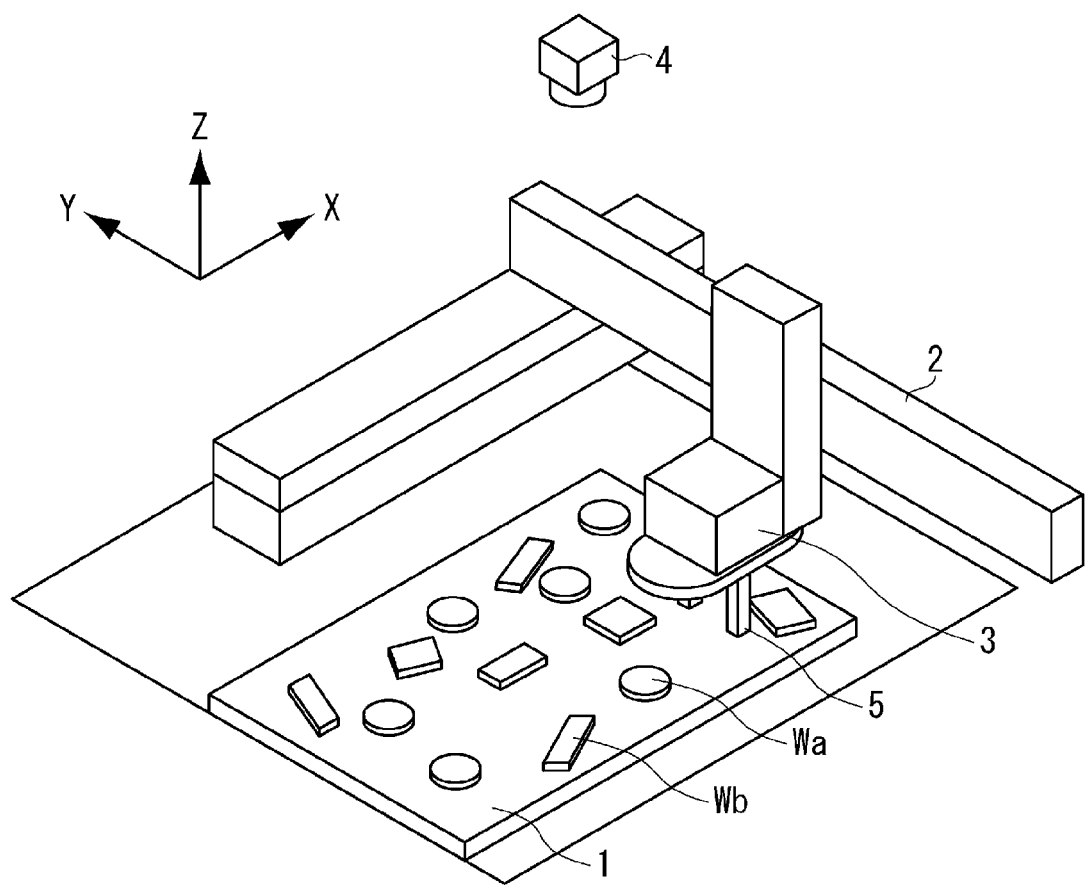
FIG. 1 illustrates a perspective view of an object grasping control apparatus according to a first exemplary embodiment of the present invention.

FIG. 1 illustrates a perspective view of an object grasping control apparatus according to a first exemplary embodiment of the present invention. Referring to FIG. 1, a grasping unit 3, which is operated by a manipulator 2, is disposed above a stage (worktable) 1. Further, a visual sensor 4, i.e., a unit for recognizing a graspable member, such as a camera, is disposed above the stage 1.

Disk-shaped graspable members Wa and rectangular graspable members Wb are randomly placed on top of the stage 1 as a plurality of graspable members W.

According to the present exemplary embodiment, the operator operates the grasping unit 3 using the manipulator 2 on the stage 1. The grasping unit 3 grasps the sides of the graspable member W and removes and transfers the graspable members from the stage 1 to a separate stage (not illustrated) one by one. The grasping unit 3 repeatedly performs such a process.

Figure 2:
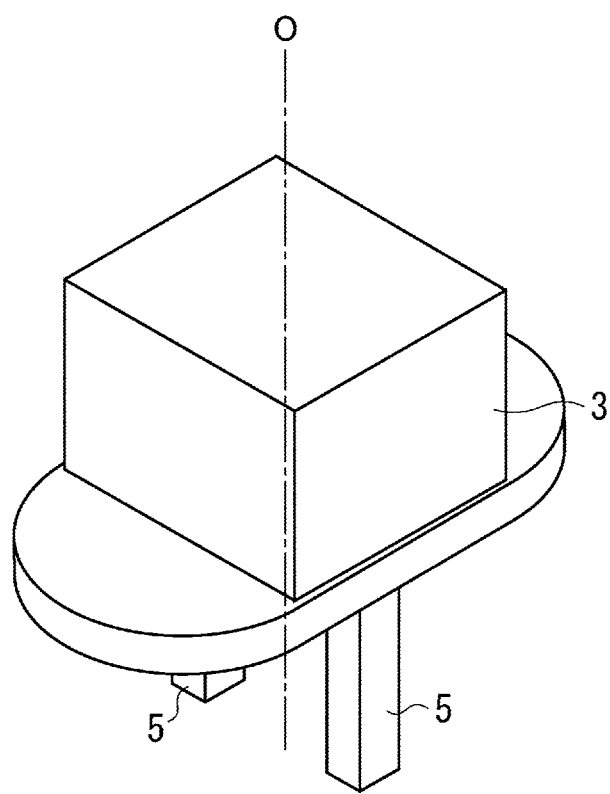
FIG. 2 illustrates a perspective view of a grasping unit.

FIG. 2 illustrates a perspective view of the grasping unit 3. The grasping unit 3 is rotatable in a horizontal direction with respect to the stage 1 with a grasping center O as an axis, according to a degree of freedom of the manipulator 2. The grasping unit 3 includes two grasping fingers 5, which can symmetrically open and close with respect to the grasping center O. The grasping fingers 5 can thus grasp the graspable member W. There may be other graspable members W near the graspable member W that is the grasping target. In such a case, the grasping unit 3 can grasp the target graspable member W without interfering with the surrounding graspable member W by appropriately controlling a rotational angle thereof. In other words, the grasping unit 3 can grasp the target graspable member W without the other graspable member W and the grasping unit 3 contacting each other.

Figure 3:
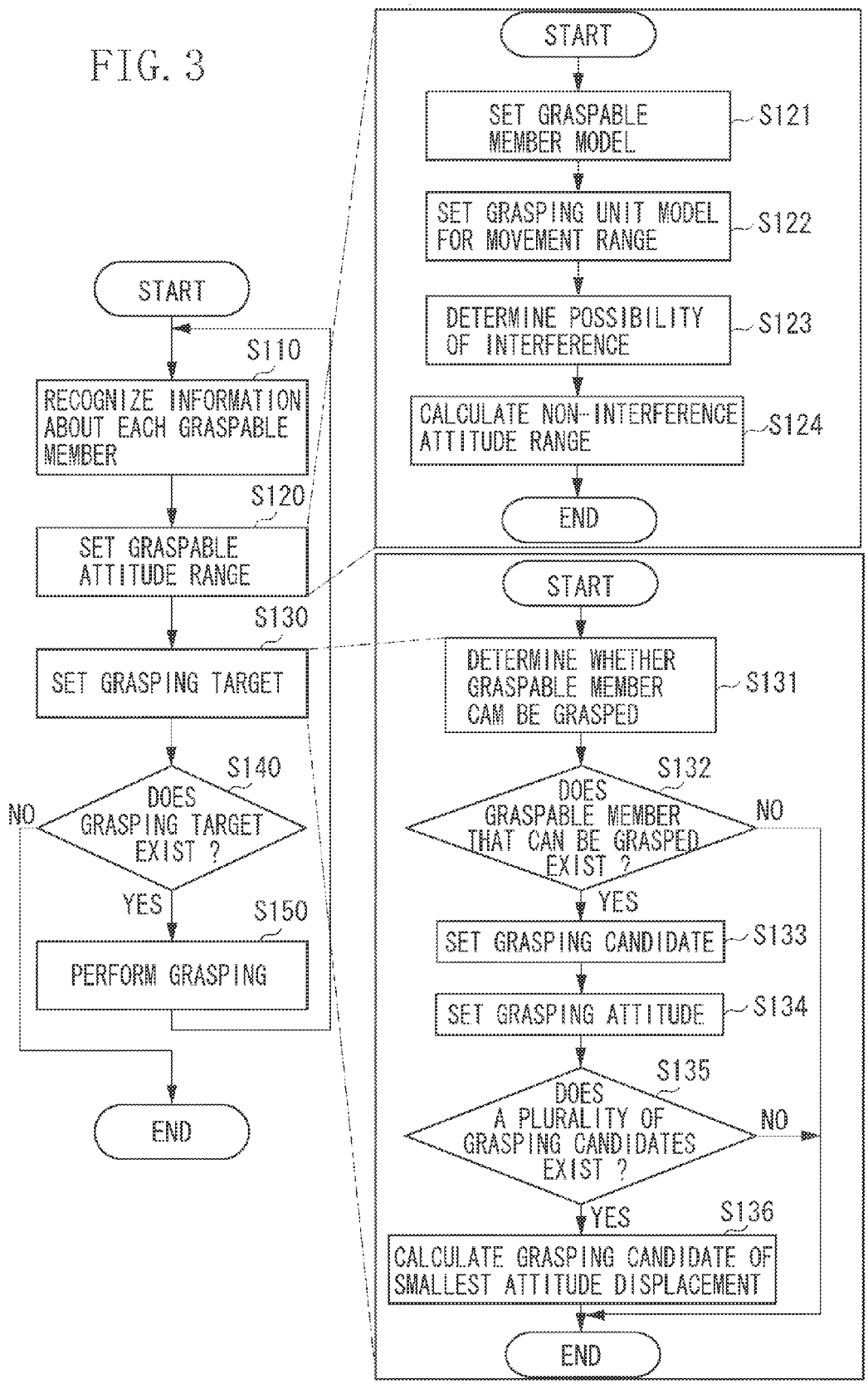
FIG. 3 is a flowchart illustrating a process according to the first exemplary embodiment of the present invention.

FIG. 3 is a flowchart illustrating a method for setting an order of grasping the graspable members W.

In step S110, the object grasping control apparatus uses the visual sensor 4 to recognize a shape, position, and attitude of each of the graspable members W. The object grasping control apparatus then assigns a graspable member identifier i to each of the graspable members W. According to the present exemplary embodiment, it is sufficient to assume within a two-dimensional plane, so that the forms of the graspable members W are recognized as a circle or a rectangle.

In step S120, a graspable attitude range is set by performing the processes in step S121 to step S124.

In step S121, the object grasping control apparatus generates a graspable member model which contains the graspable member W, based on the recognition result acquired in step S110. The graspable member model is a sum of sets of at least one convex model. It becomes easy to determine the possibility of the grasping unit 3 interfering with the graspable member W by using the convex model as an element of the graspable member model. There are various convex models, and according to the present exemplary embodiment, a circle is used as the convex model, and the model will be referred to as an approximate circle of a graspable member.

Figure 4:
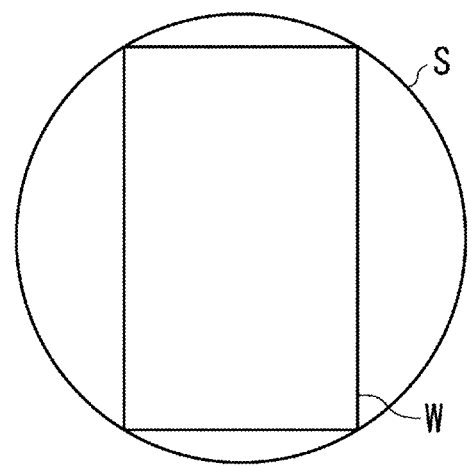
FIG. 4 illustrates a method for approximating the graspable member.
Figure 5:
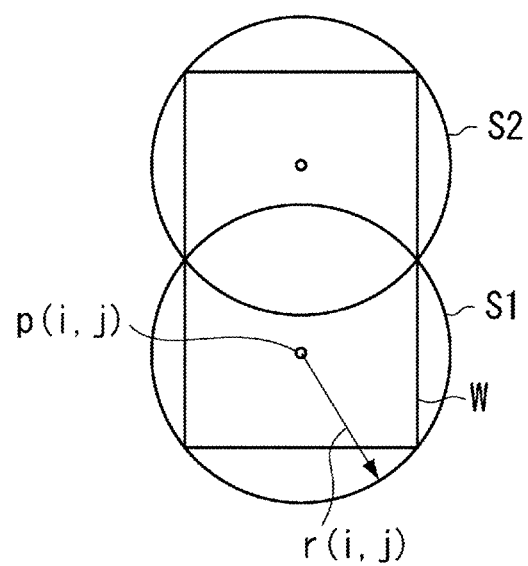
FIG. 5 illustrates a method for approximating the graspable member.

If the graspable member W is a disk-shaped object, the recognized circle itself becomes the approximate circle of a graspable member which is then used as the graspable member model. If the graspable member W is a rectangular object, a circumscribed circle becomes the approximate circle of a graspable member S as illustrated in FIG. 4, which is used as the graspable member model. However, in such a case, the size of the graspable member W becomes excessively estimated. To solve such a problem, a plurality of approximate circles of the graspable member S1, S2, . . . , etc., are set as illustrated in FIG. 5, and the sum of the set may be specified as the graspable member model.

Upon performing grasping, the object grasping control apparatus positions the grasping center O of the grasping unit 3 at the center of one of the approximate circles of the graspable member S set to the graspable member W. The object grasping control apparatus then appropriately controls the attitude of the grasping unit 3 and performs grasping.

The object grasping control apparatus then assigns an identifier j to each of the approximate circles of the graspable members S, S', . . . , etc. The approximate circle of a graspable member is thus identified by a pair (i, j) of the graspable member identifier i and the identifier j of the approximate circle of the graspable member. Coordinates of the center of the approximate circle of a graspable member S whose identifier is (i, j) are set as p (i, j) (x (i, j), y (i, j)), and the radius of the approximate circle of a graspable member S is set as r (i, j). The coordinates of the center and the radius of the approximate circle of a graspable member S can be calculated from the shape, position, and attitude of the graspable member W acquired in step S110. It is desirable to include a grasping buffer for opening and closing the grasping unit 3 within the radius of the approximate circle of a graspable member S. This is to stably perform grasping when there is a recognition error or a positioning error in a radial direction.

In step S122, the object grasping control apparatus sets a grasping unit model of the grasping unit 3 to set a model of the range of motion of the grasping unit 3. According to the present exemplary embodiment, the grasping unit model may be considered on a plane, so that it is sufficient to consider a shape that the grasping fingers 5 occupy on the stage 1 as the shape of the grasping unit model.

Figure 6:
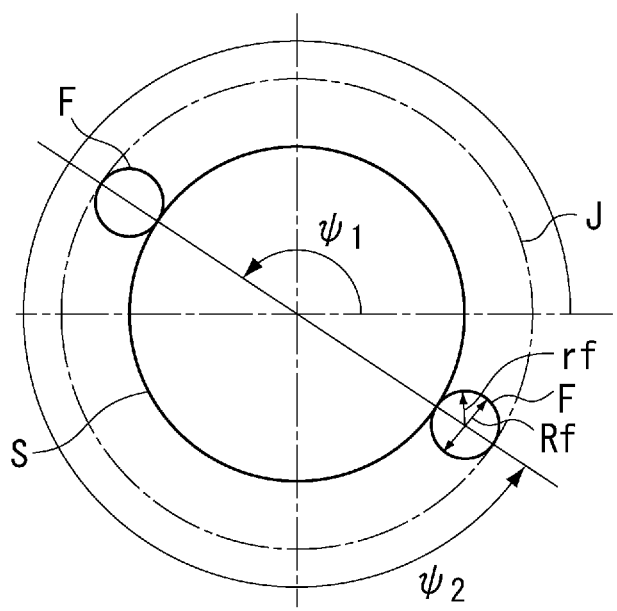
FIG. 6 illustrates a circle for determining a possibility of interference.

FIG. 6 illustrates a relation among the positions of the approximate circle of a graspable member S, an approximate circle of a grasping finger F, and a circle for determining a possibility of interference J. The circle circumscribed around a cross-section of the grasping finger 5 will be referred to as the approximate circle of a grasping finger F. It is assumed that the sizes of the two grasping fingers 5 are the same, and rf indicates a radius and Rf indicates a diameter of the approximate circle of the grasping finger F.

Further, since there are two grasping fingers 5, the relation between the positions thereof becomes a parameter of the grasping unit model. An angle at which the first grasping finger 5 is arranged with reference to an origin of a rotational angle of the grasping unit 3 will be referred to as $\psi 1$, and an angle at which the other grasping finger 5 is arrange as $\psi 2$. The radius rf, the diameter Rf, and the angles $\psi 1$ and $\psi 2$ thus become the parameters for expressing the grasping unit model. According to the present exemplary embodiment, $\psi 1=0°$ and $\psi 2=180°$.

When the grasping is to be performed, the object grasping control apparatus can position the grasping fingers 5 at various attitudes with the center of each approximate circle of a graspable member S as a rotational center. A circle of a radius (r(i, j)+Rf) from the center of each approximate circle of a graspable member S is thus set as the model for the range of motion of the grasping unit. If another graspable member W enters into such a circle, the grasping finger 5 may come into contact with the graspable member W and interfere, depending on the attitude of the grasping unit 3. Such a circle is thus referred to as a circle for determining a possibility of interference J.

In step S123, the object grasping control apparatus determines, when trying to grasp at various attitudes with respect to the approximate circle of a graspable member S of the identifier (i1, j1), whether the approximate circle of a graspable member S' of another identifier (i2, j1) may interfere with the grasping unit 3.

More specifically, the object grasping control apparatus searches whether the approximate circles of the graspable member S and S' interfere with each other. The approximate circles of the graspable member S and S' assigned to the same graspable member W and are adjacent to each other often interfere with each other.

Figure 7:
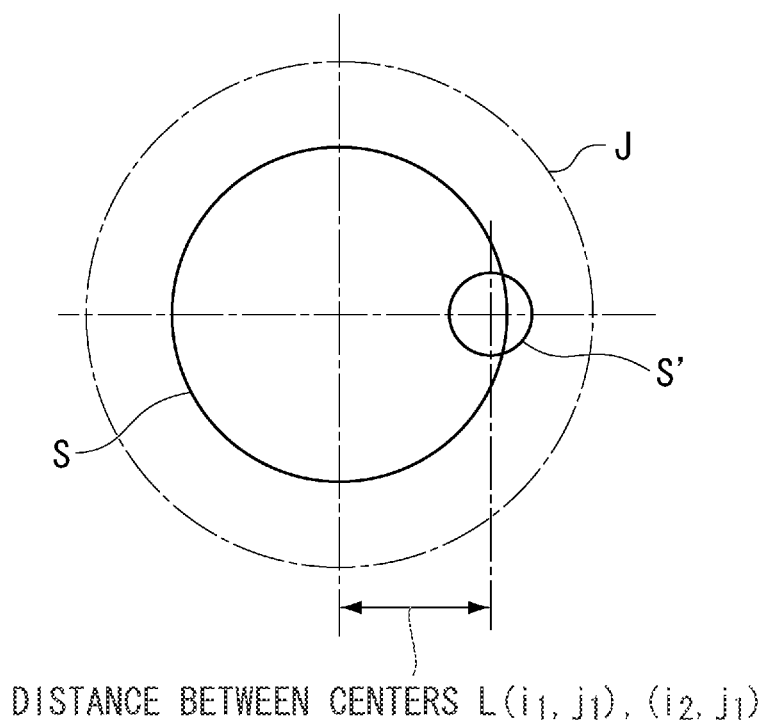
FIG. 7 illustrates a case where approximate circles of a graspable member interfere with each other.

The object grasping control apparatus obtains the sum of the radius r (i1, j1) of the approximate circle of a graspable member S of the identifier (i1, j1) and the radius r (i2, j1) of the approximate circle of a graspable member S' of the identifier (i2, j1). If the sum is greater than a distance between centers L (i1, j1), (i2, j1), the object grasping control apparatus determines that the approximate circle of a graspable member S' may interfere with the approximate circle of a graspable member S (i1, j1). A state illustrated in FIG. 7 indicates that there is interference between the approximate circles of the graspable member S and S'.

Figure 8:
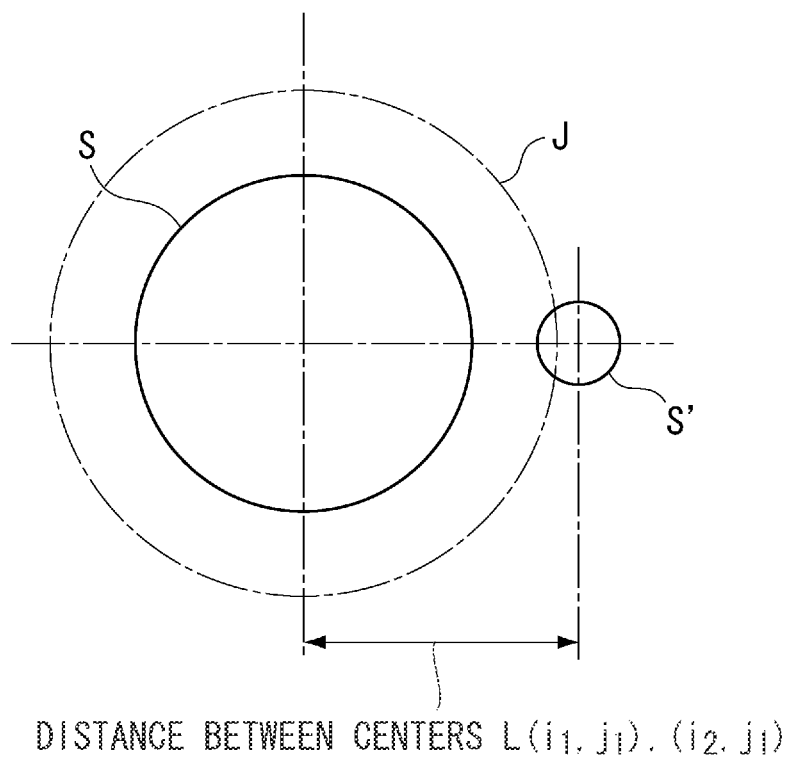
FIG. 8 illustrates a case where the circle for determining a possibility of interference and the approximate circle of a graspable member interfere with each other.

If there is no interference between the approximate circles of the graspable members S and S', the object grasping control apparatus then searches whether there is interference between the approximate circle of a graspable member S' and the circle for determining a possibility of interference J. The object grasping control apparatus obtains the sum of the radius (r(i1, j1)+Rf) of the circle for determining a possibility of interference J, set to the approximate circle of a graspable member S of the identifier (i1, j1), and the radius r (i2, j1) of the approximate circle of a graspable member S' of the identifier (i2, j1). If the sum is greater than the distance between centers L (i1, j1), (i2, j1), the object grasping control apparatus determines that the approximate circle of a graspable member S' of the identifier (i2, j1) may interfere with the circle for determining a possibility of the interference J set to the approximate circle of a graspable member S. A state illustrated in FIG. 8 indicates that there is interference between the approximate circle of a graspable member S' and the circle for determining a possibility of interference J.

If the above-described two types of interference do not occur, it is assumed that the approximate circle of a graspable member S' of the identifier (i2, j1) does not interfere when the grasping unit 3 grasps the approximate circle of a graspable member S of the identifier (i1, j1).

Figure 9:
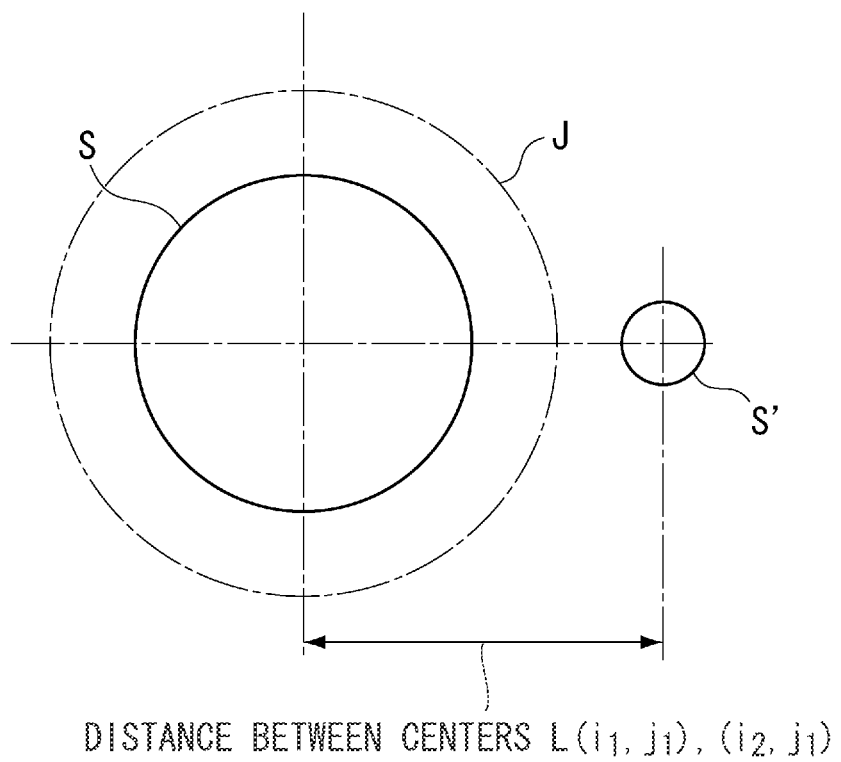
FIG. 9 illustrates a case where the circle for determining a possibility of interference and the approximate circle of a graspable member do not interfere with each other.

A state illustrated in FIG. 9 indicates that there is no interference between the circle for determining a possibility of the interference J, set to the approximate circle of a graspable member S, and the approximate circle of a graspable member S'. It is thus not necessary to consider the effect of the approximate circle of a graspable member S' when the grasping unit 3 grasps the approximate circle of a graspable member S.

The object grasping control apparatus performs the above-described process for all of the approximate circles of a graspable member S. The object grasping control apparatus then makes a list of the approximate circles of a graspable member S' which may interfere.

In step S124, the object grasping control apparatus calculates an attitude range of the grasping unit 3 whereby the grasping unit 3 does not interfere with the surrounding graspable members W, for each of the approximate circles of the graspable member S, based on the result of determining the interference. The calculated attitude range is referred to as a graspable attitude range. According to the present exemplary embodiment, the grasping unit 3 has one rotational degree of freedom, so that the graspable attitude range indicates a one-dimensional angle range.

Figure 10:
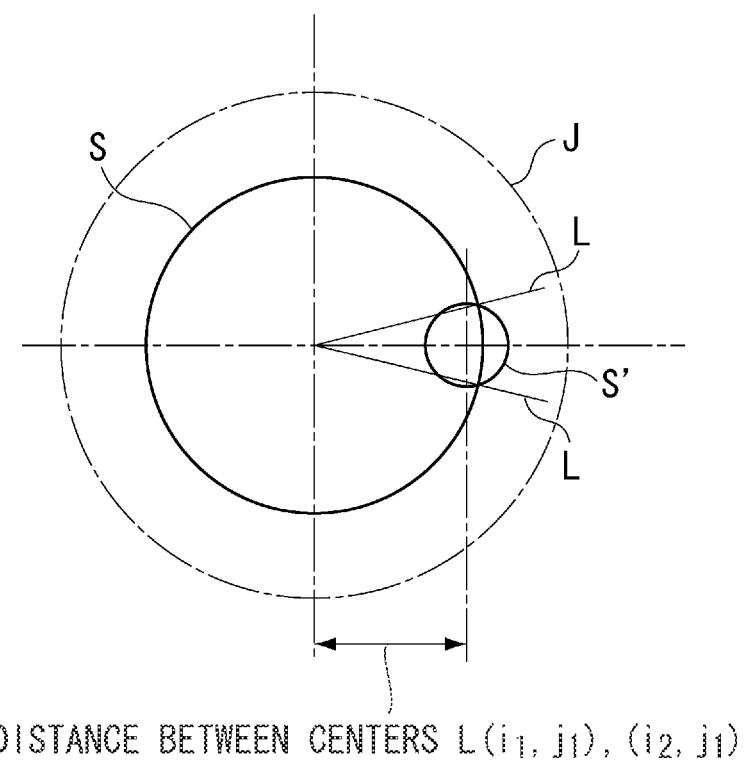
FIG. 10 illustrates a case where the approximate circles of a graspable member interfere with each other.
Figure 11:
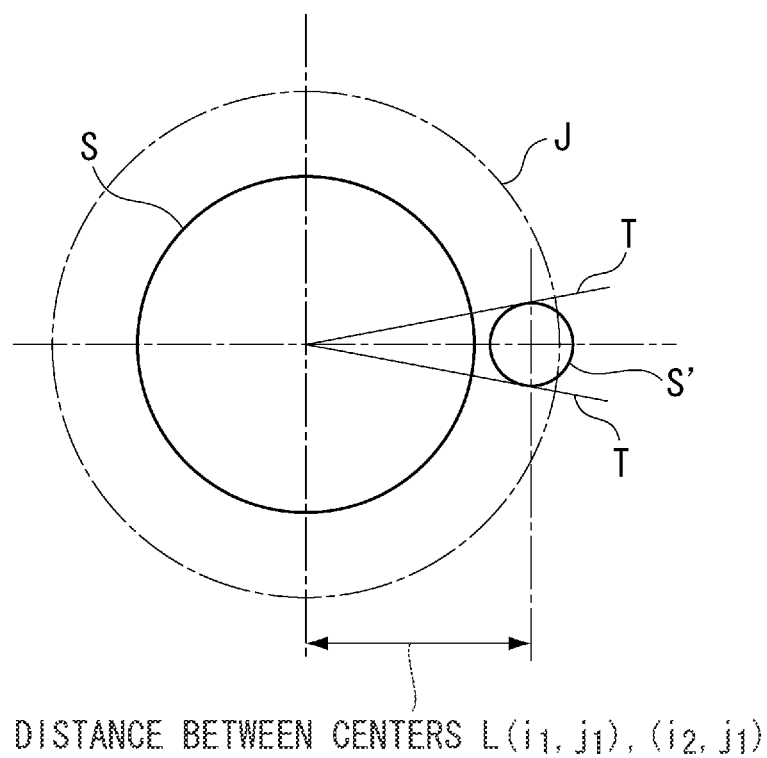
FIG. 11 illustrates a case where the circle for determining a possibility of interference and the approximate circle of a graspable member interfere with each other.

Referring to FIG. 10, the object grasping control apparatus obtains an angle formed by two straight lines L drawn from the center of the approximate circle of a graspable member S toward an intersection with the approximate circle of a graspable member S', which interferes with the approximate circle of a graspable member S. Further, referring to FIG. 11, the object grasping control apparatus obtains an angle formed by two tangential lines T drawn from the center of the approximate circle of a graspable member S to the approximate circle of a graspable member S', which interferes with the approximate circle of a graspable member S.

Figure 12:
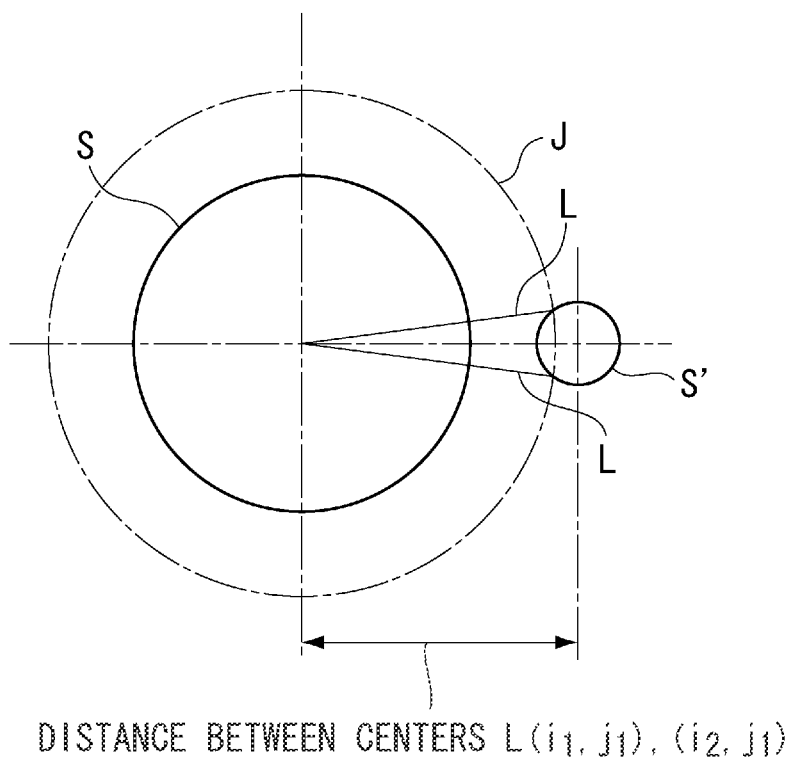
FIG. 12 illustrates a case where the circle for determining a possibility of interference and the approximate circle of a graspable member interfere with each other.

Furthermore, referring to FIG. 12, the object grasping control apparatus obtains an angle formed by two straight lines L drawn from the center of the approximate circle of a graspable member S toward an intersection between the circle for determining a possibility of interference J and the approximate circle of a graspable member S'. The object grasping control apparatus then compares the acquired angles and defines the greatest angle as a graspable member occupancy range.

If there is interference between the circle for determining a possibility of interference J and the approximate circle of a graspable member S', it is not necessary to consider the angle formed by two straight lines drawn from the center of the approximate circle of a graspable member S toward an intersection with the approximate circle of a graspable member S', which interferes with the approximate circle of a graspable member S, as illustrated in FIG. 10.

If there is a grasping attitude with respect to an approximate circle of a graspable member S in which the grasping finger 5 does not enter the graspable member occupancy range, the graspable member W can be grasped. Such an attitude range by which the grasping finger 5 does not enter the graspable member occupancy range is defined as a non-interference attitude range. The non-interference attitude range is calculated as follows.

Figure 13:
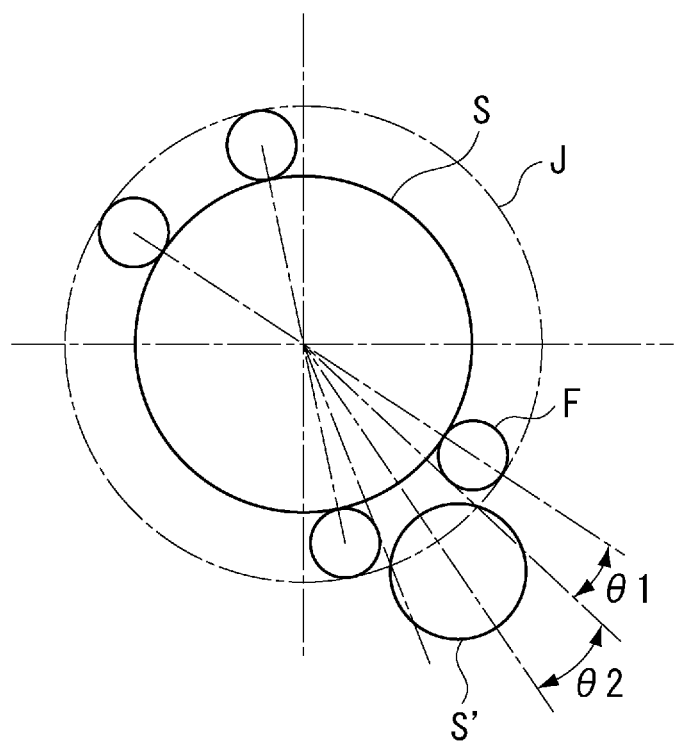
FIG. 13 illustrates an occupancy range of the graspable member and an occupancy range of a grasping finger.

Referring to FIG. 13, the horizontal axis indicates an origin of the attitude, and the counterclockwise direction indicates a positive direction. An angle formed by two tangential lines drawn from the center of an approximate circle of a graspable member S to the approximate circle of the grasping finger F is defined as a grasping finger occupancy range. If the occupancy range of the graspable member W is 2θ2 and the occupancy range of the grasping finger 5 is 2θ1, the attitude range in which one grasping finger 5 interferes with another graspable member W becomes as indicated in a graph illustrated in FIG. 14 on an angle coordinate system. If the grasping attitude is within such a range, the grasping finger 5 arranged in a direction of the origin of the attitude interferes with the graspable member W. This range is thus defined as an interference attitude range.

Figure 14:
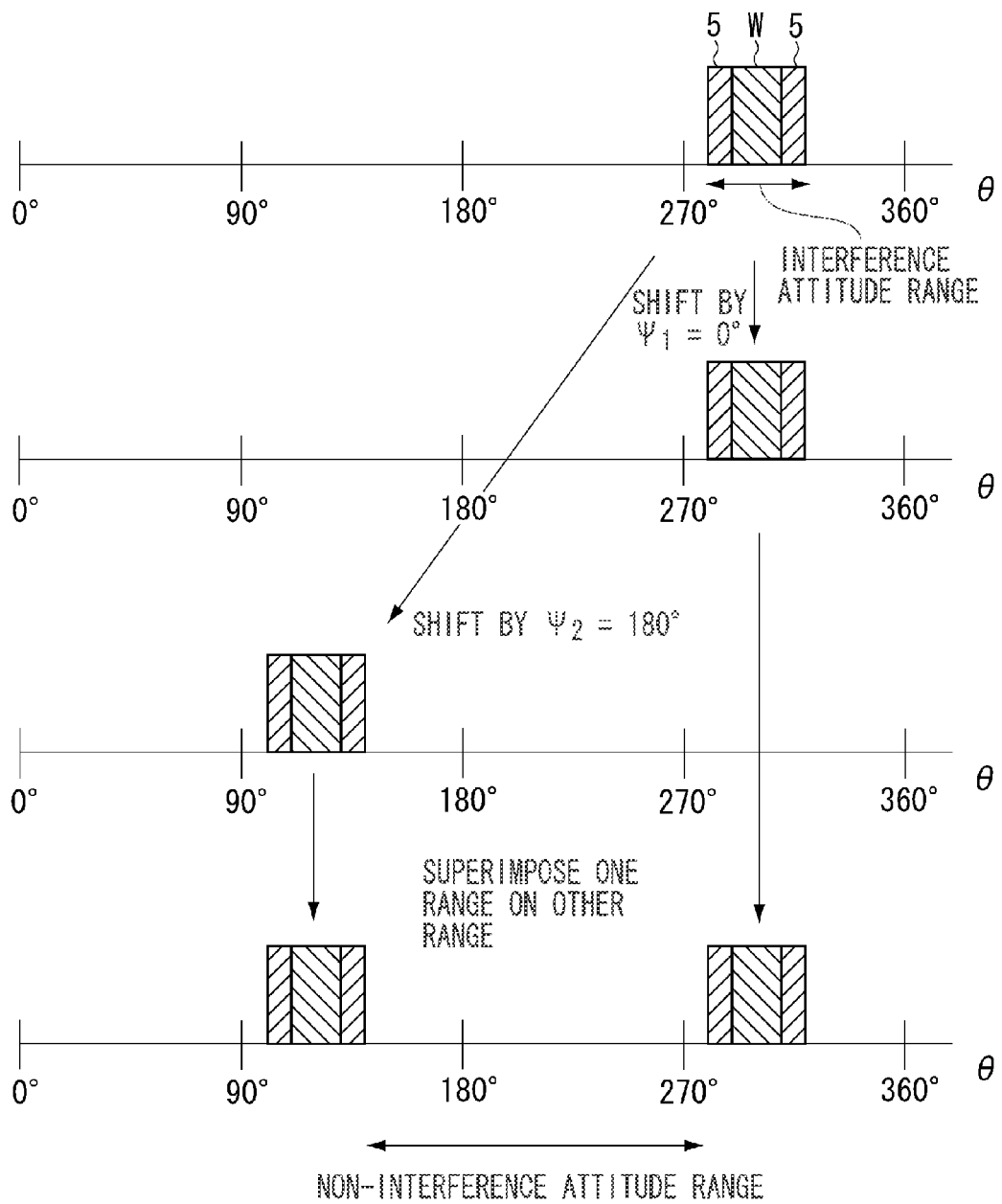
FIG. 14 is a graph illustrating a calculation method of a non-interference attitude range.

In the case of searching for a range in which both of the two grasping fingers 5 do not interfere, the graph in which the interference attitude range is shifted by an angle ψ1=0 is superimposed on the graph in which the interference attitude range is shifted by an angle ψ2=180° as illustrated in FIG. 14. If the grasping attitude is outside the range, both of the grasping fingers 5 are outside the occupancy range of the graspable member W. A similar process can be performed when there are more than two grasping fingers 5. When the rotational angle of the grasping finger 5 is within the non-interference attitude range other than the interference attitude range, the grasping finger 5 does not interfere with the adjacent approximate circle of a graspable member S'.

Figure 15:
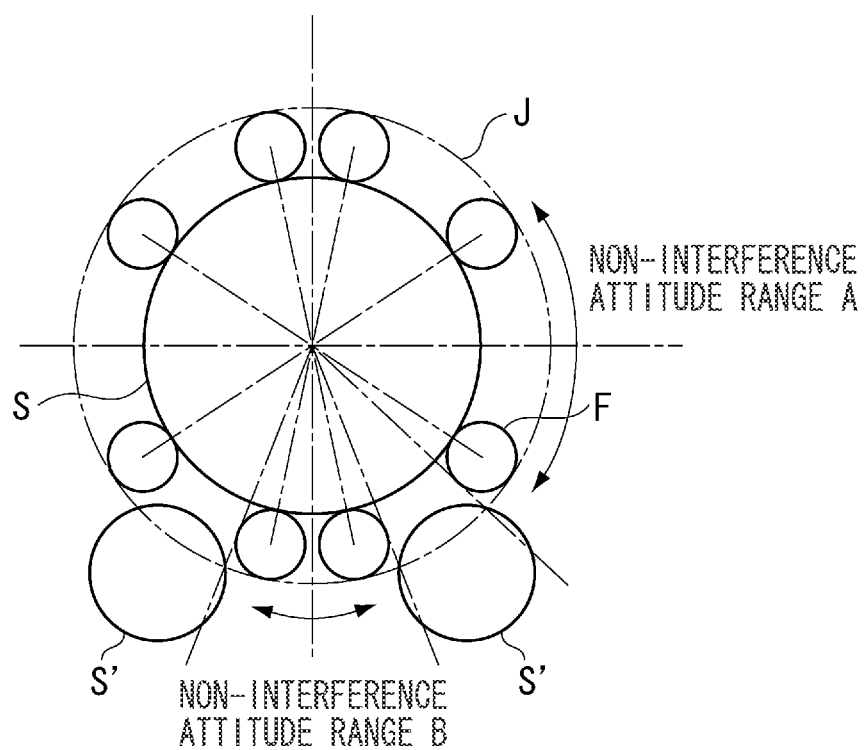
FIG. 15 illustrates a case where there is a plurality of non-interference attitude ranges.

There is a case where a plurality of non-interference attitude ranges exists, such as when there is a plurality of interfering approximate circles of a graspable member S'. In such a case, the non-interference attitude range of a maximum width is employed. In a case illustrated in FIG. 15, a non-interference attitude range A is employed.

At least one approximate circle of a graspable member S is set to each of the graspable members W. The greatest non-interference attitude range among those of the approximate circles of a graspable member S is thus determined as the graspable attitude range with respect to the graspable member W. In other words, a portion which can be most stably grasped against an error in the grasping attitude is grasped.

In step S130, a grasping target is set by performing the processes in step S131 to step S136 illustrated in FIG. 3.

In step S131, the object grasping control apparatus determines that the graspable member W having a graspable attitude range can be grasped based on the result acquired in step S120.

In step S132, the object grasping control apparatus determines whether there is a graspable member W that can be grasped. If there is a graspable member W that can be grasped (YES in step S132), the process proceeds to step S133. On the other hand, if there is no graspable member W that can be grasped (NO in step S132), it is determined that there is no grasping target, and the process in step S130 ends. The process then proceeds to step S140.

In step S133, the object grasping control apparatus sets, as a grasping candidate, the graspable member W whose size of the graspable attitude range is greater than or equal to a threshold value. According to the present exemplary embodiment, the graspable member W having the maximum graspable attitude range is set as the grasping candidate.

Figure 16:
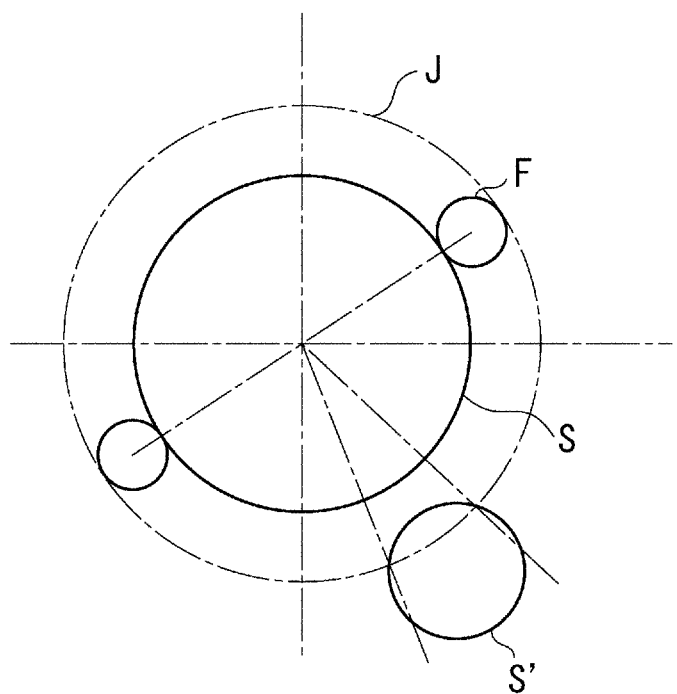
FIG. 16 illustrates a set grasping attitude.

In step S134, the object grasping control apparatus sets, with respect to the graspable member W that is set as the grasping candidate, the center of the graspable attitude range as the grasping attitude. For example, referring to FIG. 16, a positioning angle of the grasping finger 5, i.e., the approximate circle of the grasping finger F, is set as the grasping attitude. As a result, the possibility of the grasping unit 3 interfering with the approximate circle of a graspable member S' due to an error in the grasping attitude can be reduced. The current attitude of the grasping unit 3 may be directly used as the grasping attitude for grasping the grasping candidate with which there is no possibility of interference, such as an isolated graspable member W.

In step S135, the object grasping control apparatus determines whether there is a plurality of grasping candidates. If there is one grasping candidate (NO in step S135), the object grasping control apparatus determines the graspable member W as the grasping target, and the process in step S130 ends. If there is a plurality of grasping candidates (YES in step S135), the process proceeds to step S136.

In step S136, the object grasping control apparatus compares, when the graspable attitude ranges are the same values for the plurality of grasping candidates, each of the set grasping attitudes and the current attitude of the grasping unit 3. The object grasping control apparatus then determines the graspable member W whose difference between the set grasping attitude and the current attitude of the grasping unit 3 is the smallest as the grasping target. The object grasping control apparatus thus performs object grasping control. As a result, when performing grasping, an attitude displacement of the grasping unit 3 becomes small, so that operation efficiency of the grasping unit 3 is improved. When there is a plurality of grasping targets, a distance to a transfer destination may be uniquely defined in the index.

In step S140, the object grasping control apparatus determines whether there is a graspable member W which is the grasping target. If there is such a graspable member W (YES in step S140), the process proceeds to step S150. If there is no such graspable member (NO in step S140), the process ends.

In step S150, the object grasping control apparatus controls the grasping unit 3 to grasp the set grasping target with the set attitude and performs grasping of the graspable member W. Upon completing grasping, the process returns to step S110.

As described above, according to the present exemplary embodiment, the graspable member W whose surrounding graspable members W are less likely to interfere with the grasping fingers 5 is preferentially grasped. Further, the grasping finger 5 is arranged at a position distant from the surrounding graspable members W, so that grasping can be steadily performed regardless of an attitude recognition error by the visual sensor 4 or a positioning error in the grasping attitude.

Furthermore, if there is a plurality of graspable members W whose degrees of interference are the same, the change in the attitude of the grasping unit 3 can be reduced. In general, an actuator which changes the attitude of the grasping unit 3 are often lighter and of lower output as compared to a base portion of the manipulator 2. The reduction in the attitude change of the grasping unit 3 can thus contribute to improvement in the operation efficiency.

Figure 17:
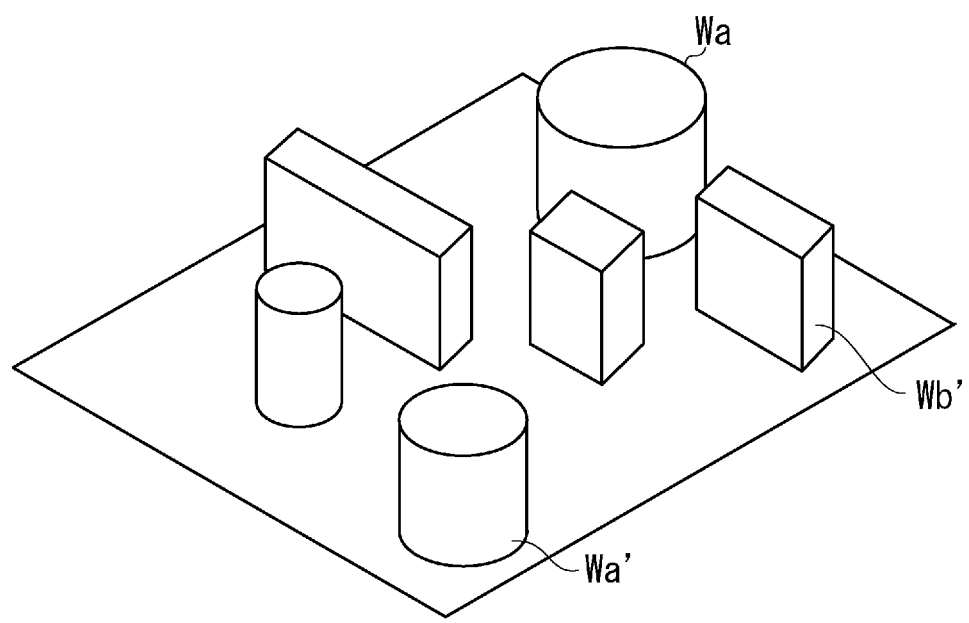
FIG. 17 illustrates a schematic view of another example to which the first exemplary embodiment is applied.

According to the first exemplary embodiment, the graspable member W is a plate-like object. However, the same method is applicable in a case where the graspable member W is a cylinder Wa' or a rectangular solid Wb' as illustrated in FIG. 17.

Figure 18:
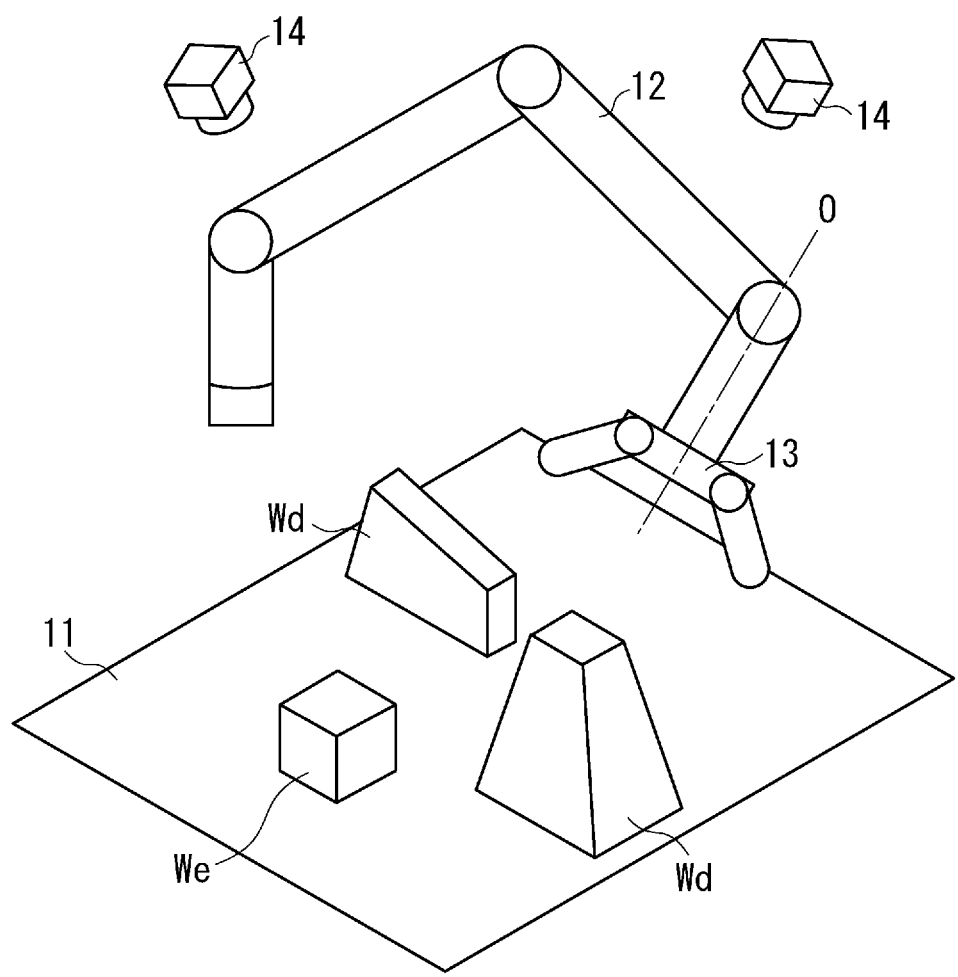
FIG. 18 illustrates a perspective view of an object grasping control apparatus according to a second exemplary embodiment of the present invention.

FIG. 18 illustrates a perspective view of an object grasping control apparatus according to a second exemplary embodiment of the present invention. Referring to FIG. 18, cubic graspable members Wc and truncated quadrangular pyramid-shape graspable members Wd are randomly placed on a stage 11 as a plurality of graspable members W. According to the present exemplary embodiment, a user uses a manipulator 12 to cause a grasping unit 13 to approach the graspable member W from above the stage 11 and grasp the graspable member W. The grasping unit 13 thus removes and transfers the graspable members W from the stage 11 one by one. Further, a plurality of visual sensors 14 is arranged above the stage 11 to enable stereoscopically viewing the graspable members W.

Figure 19:
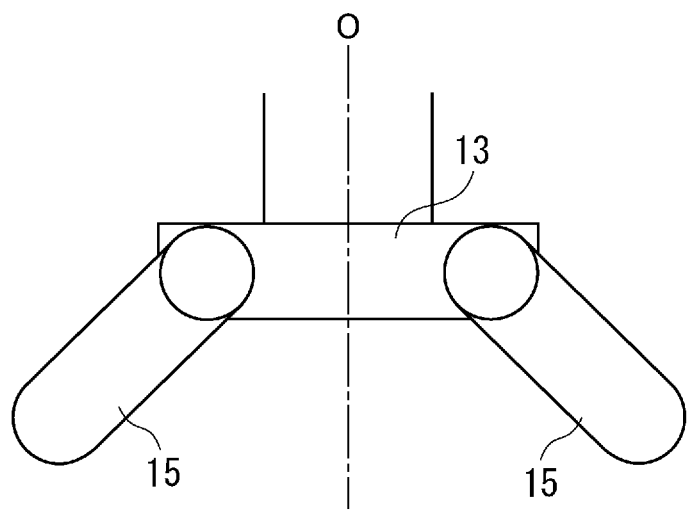
FIG. 19 illustrates a lateral view of the grasping unit.

FIG. 19 illustrates a lateral view of the grasping unit 13, which is caused to operate using the manipulator 12. The grasping unit 13 is rotatable around the grasping center O by the degree of freedom of the manipulator 12. Two grasping fingers 15 included in the grasping unit 13 symmetrically open and close with respect to the grasping center O and can grasp the graspable member W. The grasping unit 13 can grasp the graspable member W at various attitudes according to the degree of freedom of the manipulator 12 and can freely rotate around the grasping center O according to the degree of freedom of a final axis.

There may be other graspable members W near the graspable member W that is the grasping target. In such a case, the target graspable member W can be grasped without the surrounding graspable member W interfering with the grasping finger 15 of the grasping unit 13 by appropriately controlling the attitude thereof.

Figure 20:
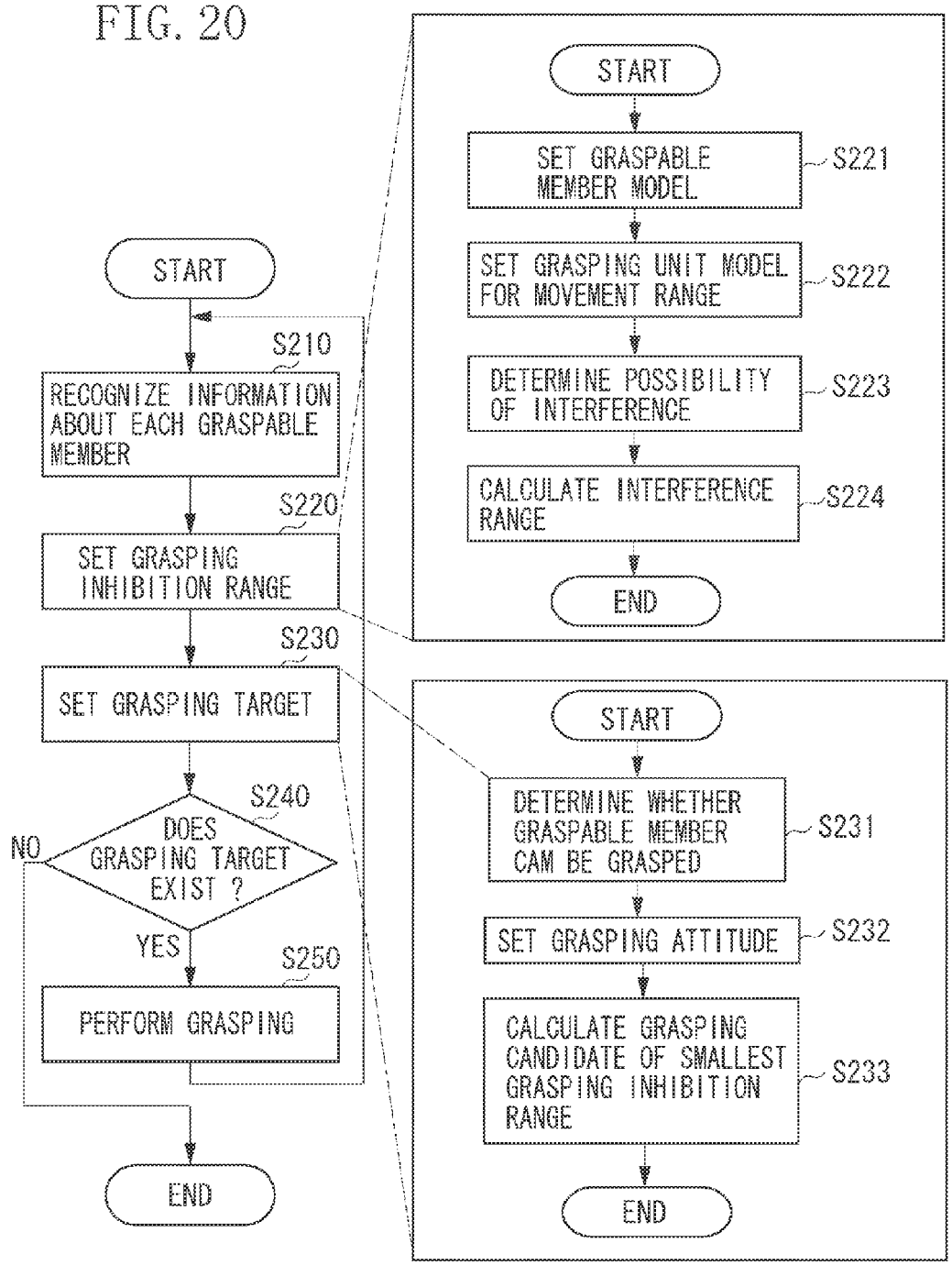
FIG. 20 is a flowchart illustrating a process according to the second exemplary embodiment of the present invention.

FIG. 20 is a flowchart illustrating a process according to the second exemplary embodiment of the present invention.

In step S210, the object grasping control apparatus uses the plurality of visual sensors 14 to recognize the shape, position, and attitude of the graspable member W and assigns the graspable member identifier i to the graspable member W. The object grasping control apparatus recognizes the shape of the graspable member W as a cube or a truncated quadrangular pyramid.

In step S220, the object grasping control apparatus sets a grasping inhibition range by performing the processes in step S221 to step S224.

In step S221, the object grasping control apparatus generates a graspable member model that includes the graspable members W, based on the recognition result acquired in step S210. The graspable member model is a sum of sets of at least one convex model. It becomes easy to determine the possibility of the grasping unit 3 interfering with the graspable member W by using the convex model as an element of the graspable member model. According to the present exemplary embodiment, a sphere is used among various convex models, and the model will be referred to as an approximate sphere of a graspable member.

Figure 21:
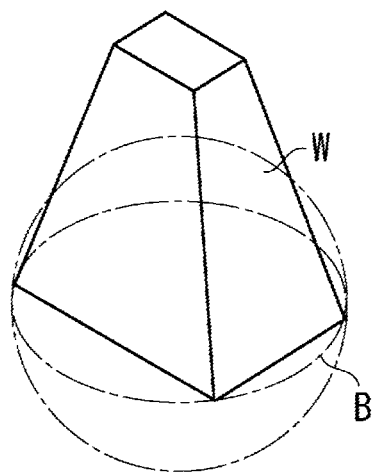
FIG. 21 illustrates a method for approximating the graspable member.
Figure 22:
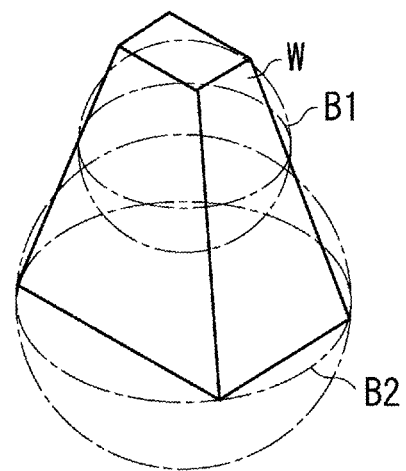
FIG. 22 illustrates a method for approximating the graspable member.

If the graspable member W is a cubic object, a circumscribing sphere becomes the approximate sphere of a graspable member, which is then used as the graspable member model. If the graspable member W is a pyramid-shaped object, the size of the graspable member W becomes excessively estimated by containing the graspable member W in one approximate sphere of a graspable member B as illustrated in FIG. 21. To solve such a problem, the pyramid-shaped object is contained in a plurality of approximate spheres of a graspable member B1, B2, . . . , etc., as illustrated in FIG. 22 and is then expressed as a sum of the set.

Upon performing grasping, the object grasping control apparatus positions the grasping center O of the grasping unit 13 at the center of one of the approximate spheres of a graspable member B set to the graspable member W. The object grasping control apparatus then appropriately controls the attitude of the grasping unit 13 and performs grasping The object grasping control apparatus then assigns an identifier j to the approximate sphere of a graspable member B of each convex model in each graspable member model. The approximate sphere of a graspable member B of each convex model is thus identified by a pair (i, j) of the identifiers i and J.

The coordinates of the center of the approximate sphere of a graspable member B whose identifier is (i, j) are set as p (i, j) (x(i, j), y (i, j), z(I, j)), and the radius of the approximate sphere of a graspable member B is set as r (i, j). The coordinates of the center and the radius can be calculated from the shape, position, and attitude of the graspable member W acquired in step S210.

Figure 23:
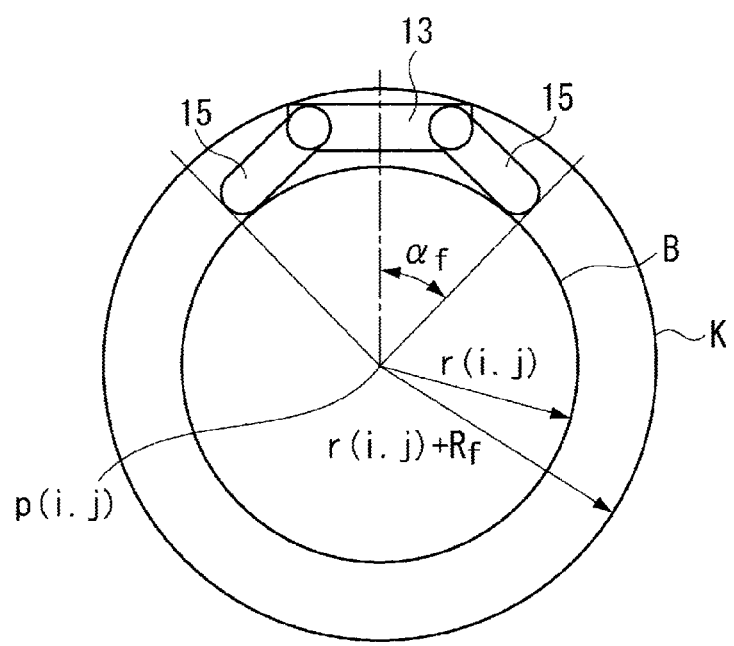
FIG. 23 illustrates a range of motion of the grasping unit.

In step S222, the object grasping control apparatus sets the grasping unit model of the grasping unit 13 to set a model of the range of motion of the grasping unit. Referring to FIG. 23, the radius of the sphere enclosing the grasping unit 13 when the grasping unit 13 is moved close to the approximate sphere of a graspable member B is set as (r (i, j)+Rf). Further, an angle the grasping unit 13 subtends from the center of the approximate sphere of a graspable member B is set as 2αf. The diameter Rf and the angle of the grasping finger of the grasping unit 13 are not fixed values and may be a function of the radius r(i, j) of the approximate sphere of a graspable member B. The diameter Rf and the angle of thus become the parameters for expressing the grasping unit model.

The object grasping control apparatus sets a sphere having the same center as the approximate sphere of a graspable member B and the radius (r(i, j)+Rf) from the center of the approximate sphere of a graspable member B. Such a sphere is referred to as a sphere for determining a possibility of interference K.

In step S223, the object grasping control apparatus determines, when trying to grasp at various attitudes with respect to the approximate sphere of a graspable member B of the identifier (i1, j1), whether the approximate sphere of a graspable member B' of the identifier (i2, j1) interferes with the grasping unit 13.

Figure 24:
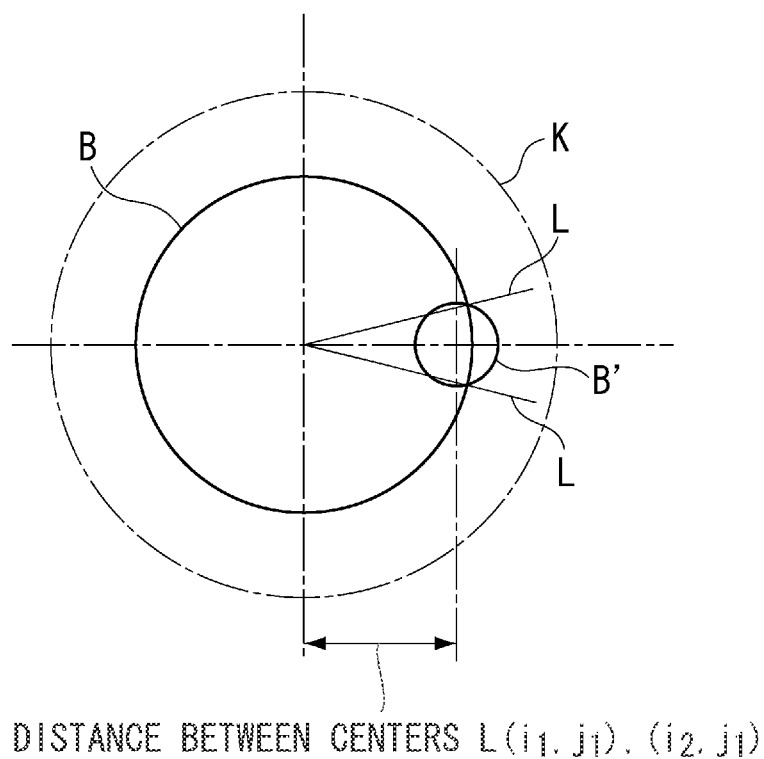
FIG. 24 illustrates a case where approximate spheres of graspable members interfere with each other.

More specifically, the object grasping control apparatus searches whether the approximate circles of the graspable member B and B' adjacent to each other as illustrated in FIG. 24 interfere with each other. The approximate spheres of a graspable member B and B' which are assigned to the same graspable member W and are adjacent to each other often interfere with each other.

The object grasping control apparatus obtains the sum of the radius r (i1, j1) of the approximate sphere of a graspable member B of the identifier (i1, j1) and the radius r (i2, j1) of the approximate sphere of a graspable member B' of the identifier (i2, j1). If the sum is greater than a distance between centers L (i1, j1), (i2, j1), the object grasping control apparatus determines that there is a possibility that the approximate sphere of a graspable member B interferes with the approximate sphere of a graspable member B'.

If there is no interference between the approximate sphere of a graspable member B and the approximate sphere of a graspable member B', the object grasping control apparatus then searches whether there is interference between the approximate sphere of a graspable member B and the sphere for determining a possibility of interference K. The object grasping control apparatus obtains the sum of the radius (r (i1, j1)+Rf) of the sphere for determining a possibility of interference K and the radius r (i2, j1) of the approximate sphere of a graspable member B. If the sum is greater than the distance between centers L (i1, j1), (i2, j1), the object grasping control apparatus determines that there is a possibility that the approximate sphere of a graspable member B interferes with the sphere for determining a possibility of interference K.

If the above-described two types of interference do not occur, the object grasping control apparatus determines that the approximate sphere of a graspable member B' of the identifier (i2, j1) does not affect grasping of the approximate sphere of a graspable member B of the identifier (i1, j1). The object grasping control apparatus performs the above-described process for all of the approximate spheres of a graspable member B. The object grasping control apparatus makes a list of the approximate spheres of a graspable member B' that may interfere with the approximate sphere of a graspable member B.

In step S224, the object grasping control apparatus calculates, based on the interference determination result, the size of the range in which the grasping unit 13 may interfere with the surrounding graspable members W for each of the graspable members W.

Figure 25:
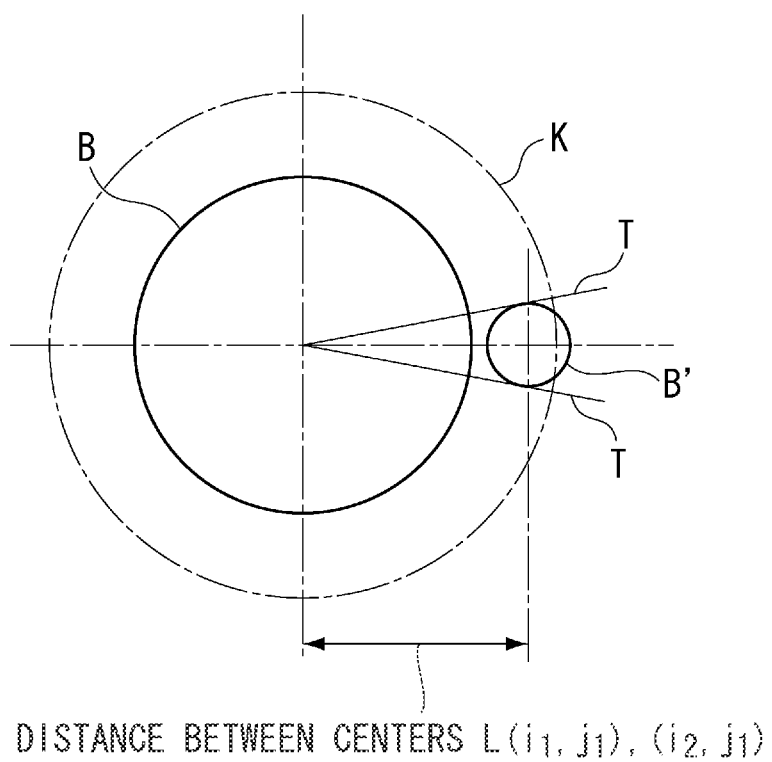
FIG. 25 illustrates a case where a sphere for determining a possibility of interference and the approximate sphere of a graspable member interfere with each other.

More specifically, the object grasping control apparatus obtains an apex angle of a cone formed by a straight lines L drawn from the center of the approximate sphere of a graspable member B to a crossed circle formed with the interfering approximate sphere of a graspable member B'. This is as illustrated in FIG. 24. Further, the object grasping control apparatus obtains the apex angle of the cone formed by a tangential line T drawn from the center of the approximate sphere of a graspable member B to the interfering approximate sphere of a graspable member B'. This is as illustrated in FIG. 25.

Figure 26:
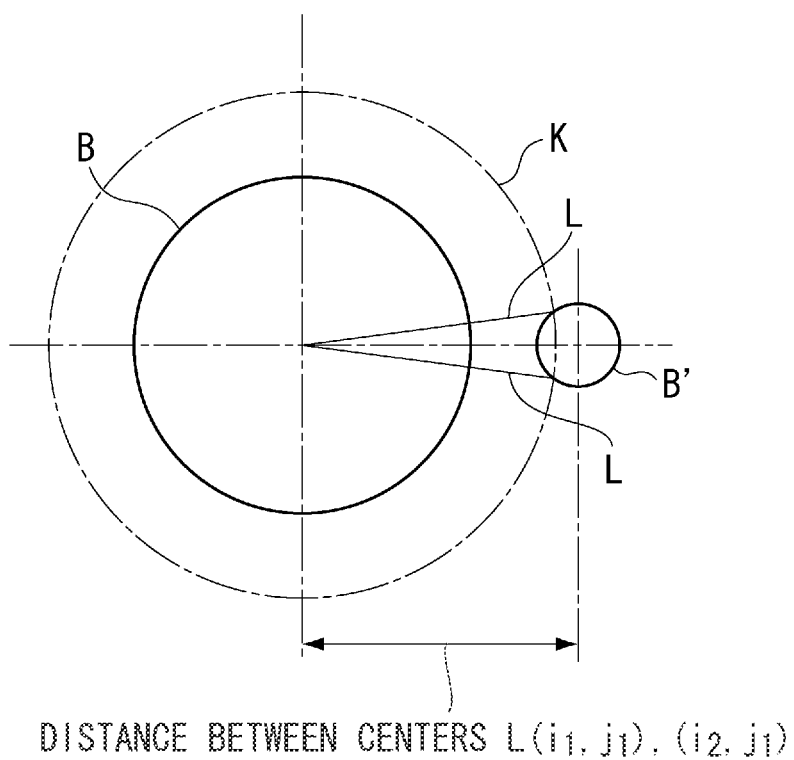
FIG. 26 illustrates a case where a sphere for determining a possibility of interference and the approximate sphere of a graspable member interfere with each other.

Furthermore, the object grasping control apparatus obtains the apex angle of the cone formed by the straight lines L drawn from the center of the approximate sphere of a graspable member B to a crossed circle formed by the sphere for determining a possibility of interference K and the interfering approximate sphere of a graspable member B'. This is as illustrated in FIG. 26. The object grasping control apparatus compares the apex angles and defines the greatest apex angle as the occupancy range of the graspable member.

If there is interference between the sphere for determining a possibility of interference K and the approximate sphere of a graspable member B, it is not necessary to consider the apex angle of the cone formed by straight lines L drawn from the center of the approximate sphere of a graspable member B to the crossed circle formed with the interfering approximate sphere of a graspable member B', as illustrated in FIG. 24.

The object grasping control apparatus adds the sizes of the occupancy ranges of the graspable member calculated from all of the approximate spheres of a graspable member B' with which there is a possibility of interference with respect to the approximate sphere of a graspable member B. The sum is then set as a size of an interference range of the approximate sphere of a graspable member B. If such a value is large, it indicates that there is a number of other approximate spheres of a graspable member B' in the surrounding that interfere with the grasping unit 13 when the approximate sphere of a graspable member B is to be grasped. Further, it indicates that a number of other approximate spheres of a graspable member B' in the surrounding that interfere with the grasping unit 13 exist much closer to the approximate sphere of a graspable member B.

At least one approximate sphere of a graspable member B is set to each of the graspable member W, so that the smallest interference range is set as the size of the grasping inhibition range of the graspable member W. This indicates that a portion of the graspable member W at which the surrounding graspable members do not become obstructive is grasped.

In step S230, the grasping target is set by performing step S231 to step S233.

In step S231, the object grasping control apparatus regards, based on the result acquired in step S220, the graspable members W, whose size of the grasping inhibition range is greater than or equal to a threshold value, as difficult to grasp. In contrast, the object grasping control apparatus sets the graspable members W whose size of the grasping inhibition range is less than the threshold value as the grasping candidates. The threshold value is appropriately determined by experiments.

In step S232, the object grasping control apparatus sets, within the range of motion of the manipulator 12, the appropriate grasping attitude with respect to the grasping candidate, by using a method such as random sampling. If none of the approximate spheres of a graspable member B which may interfere with the grasping unit 13 interferes with the grasping unit 13 in the set grasping attitude, the graspable member W can be grasped in the grasping attitude.

Figure 27:
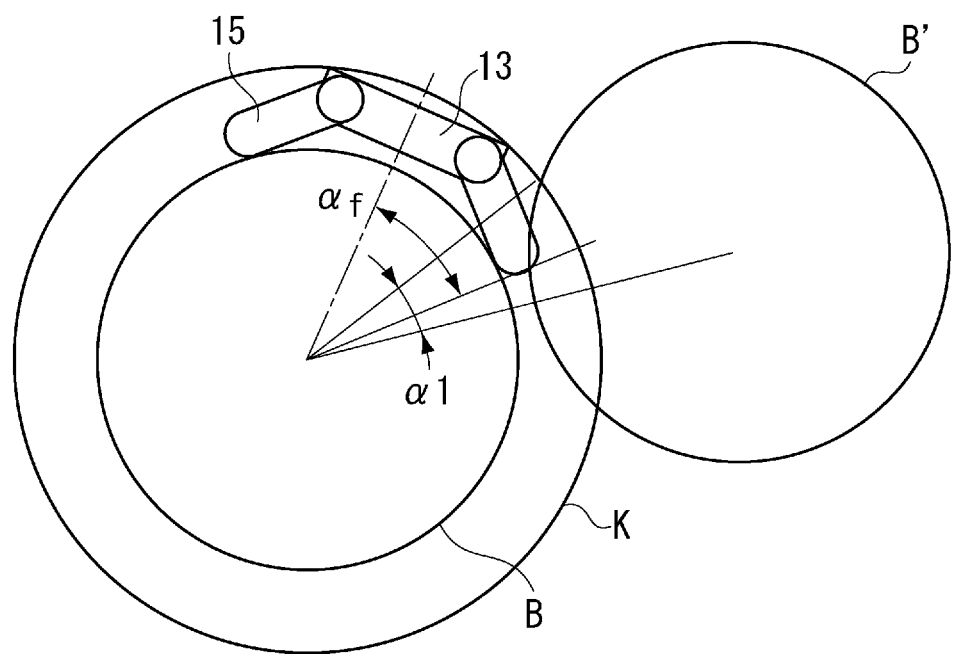
FIG. 27 illustrates a case where interference occurs in a certain grasping attitude.

FIG. 27 is a cross-sectional view of the grasping unit 13 in a certain grasping attitude, in a plane formed by a vector directed from the center of the approximate sphere of a graspable member B towards the grasping center O and a vector directed towards the center of the approximate sphere of a graspable member B' that may interfere with the grasping unit 13.

Figure 28:
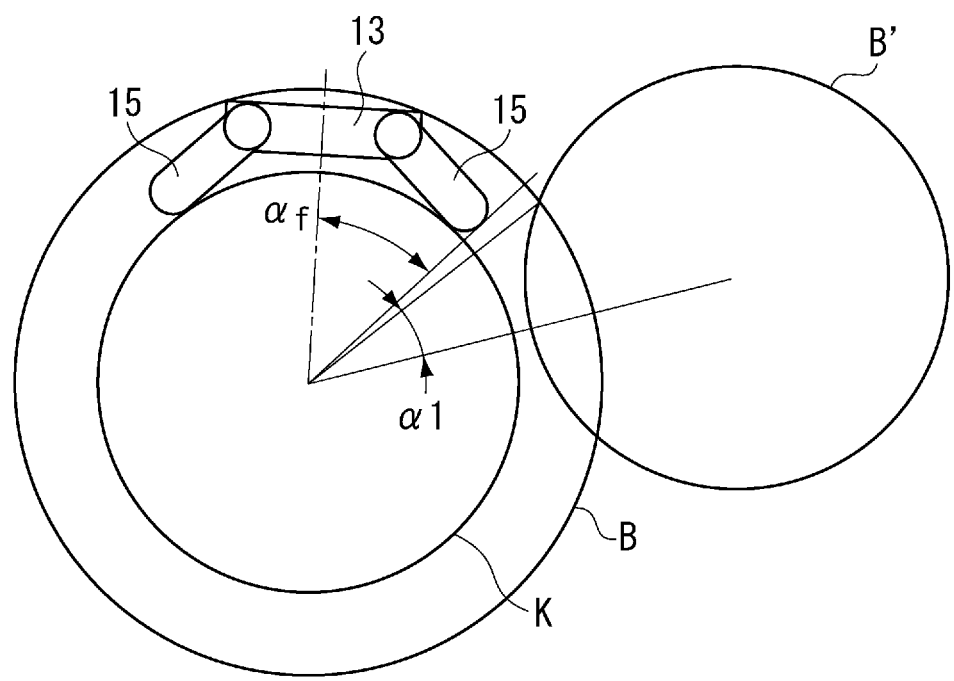
FIG. 28 illustrates a case where interference does not occur in a certain grasping attitude.

If the sum of the occupancy range of the graspable member al and an angle of the grasping unit 13 subtends is greater than the angle formed by the above-described two vectors, interference occurs in that grasping attitude. If the sum is less than the angle, interference does not occur as illustrated in FIG. 28. The object grasping control apparatus performs the determination for all approximate spheres of a graspable member B that may interfere with the approximate sphere of a graspable member B'. If there is no interference, the grasping attitude is employed, and if there is even one case of interference, the process for setting the grasping attitude is started over from a random setting. Further, if the graspable member W does not become graspable even when the grasping attitude is randomly set and the determination is repeated a predetermined number of times, the object grasping control apparatus removes the graspable member W from the grasping candidates.

In step S233, the object grasping control apparatus sets the graspable grasping candidate with the smallest grasping inhibition range as the grasping target. As a result, the graspable member W which is not greatly affected by the surrounding graspable members W can be preferentially grasped. If there is a plurality of grasping targets, the grasping target is uniquely determined by using the distance to the transfer destination as the index.

In step S240, the object grasping control apparatus determines whether there is a grasping target. If there is no grasping target (NO in step S240), the process ends. On the other hand, if there is a grasping target (YES in step S240), the process proceeds to step S250.

In step S250, the object grasping control apparatus performs grasping. The process then proceeds to step S210.

As described above, according to the present exemplary embodiment, when performing grasping, the graspable member W which hardly interferes with the surround graspable members is preferentially grasped.

Figure 29:
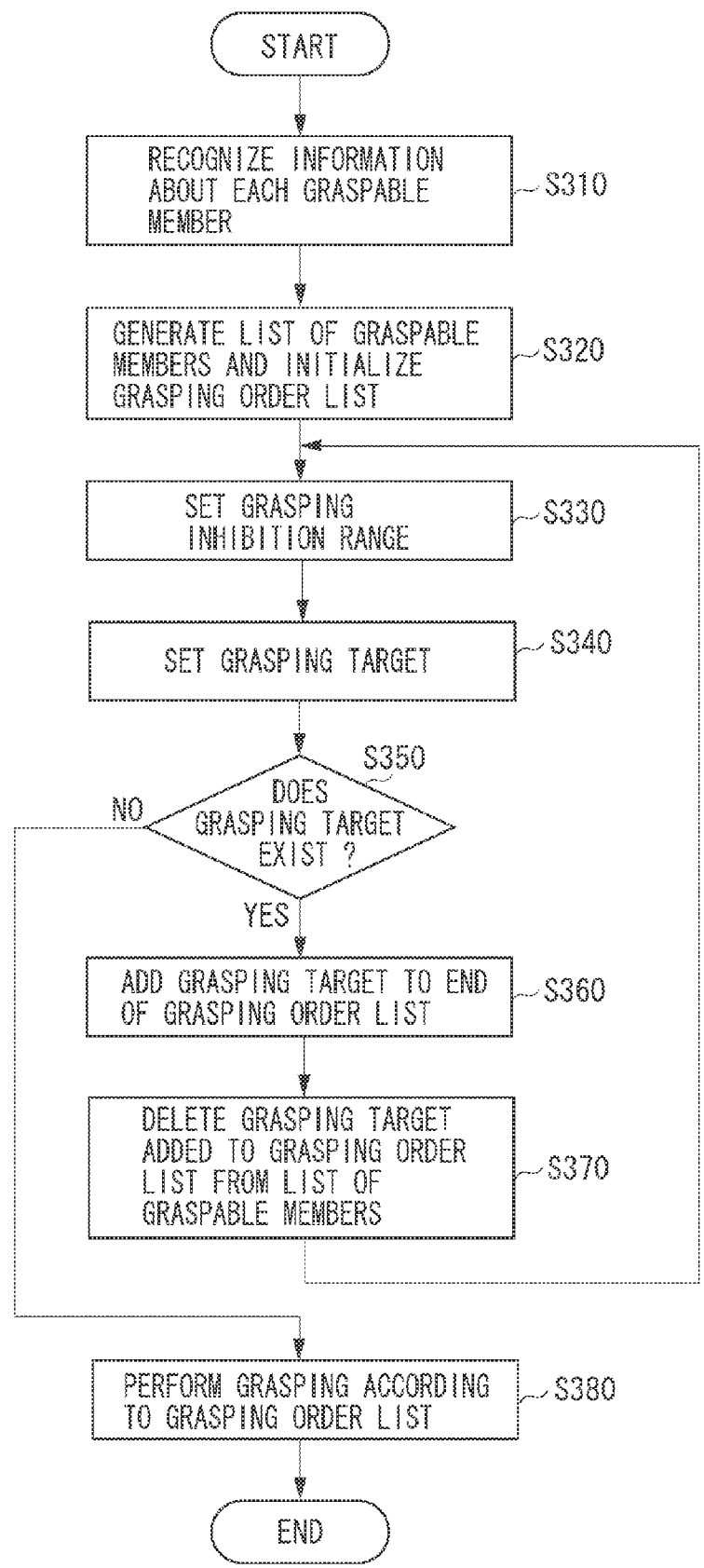
FIG. 29 is a flowchart illustrating another process to which the second exemplary embodiment is applied.

Further, as illustrated in the flowchart of FIG. 29, the order of the processes to the end of the process may be set before performing the series of grasping.

In step S310, the object grasping control apparatus uses the plurality of visual sensors 14 to recognize the shape, position, and attitude of the graspable member W and assigns the graspable member identifier i to the graspable member W. This is similar to step S210 illustrated in FIG. 20.

In step S320, the object grasping control apparatus generates a list of the graspable members W and initializes a grasping order list. In other words, the object grasping control apparatus clears the grasping order list.

In step S330, the processes in step S221 to step S224 illustrated in FIG. 20 are performed similarly as in step S220 illustrated in FIG. 20.

In step S340, the processes in step S231 to step S233 illustrated in FIG. 20 are performed similarly as in step S220.

In step S350, the object grasping control apparatus determines whether there is a grasping target. If there is no grasping target (NO in step S350), the process then proceeds to step S380. On the other hand, if there is a grasping target (YES in step S350), the process proceeds to step S360.

In step S360, the object grasping control apparatus adds the grasping target to the end of the grasping order list.

In step S370, the object grasping control apparatus deletes the grasping target added in step S360 from the list of the graspable members. The process then returns to step S330.

In step S380, the object grasping control apparatus performs grasping according to the order described in the grasping order list. The process then ends.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-223792 filed Sep. 29, 2009, which is hereby incorporated by reference herein in its entirety.

What is claimed is:

1. An object grasping control method comprising:
recognizing, using a processor, at least one of a shape, position, and orientation of each of the plurality of graspable members using a visual sensor;
generating, using the processor, a list of the recognized graspable members;
setting, using the processor, respective first orientation ranges of a grasping unit for grasping each of the plurality of graspable members without interfering with other graspable members, based on at least one of the shape, position, and orientation of each of the plurality of graspable members;
selecting, using the processor, as a target graspable member, one graspable member for which the set first orientation range is greater than a predetermined value;
adding, using the processor, the selected target graspable member to a list of the target graspable members; and
deleting, using the processor, the selected target graspable member from the list of the recognized graspable members.

2. The object grasping control method according to claim 1, further comprising:
setting, using the processor, the respective first orientation ranges by setting a range of motion of each of the graspable members and the grasping unit using at least one convex model.

3. The object grasping control method according to claim 2, further comprising:
setting, using the processor, the respective first orientation ranges using a circular convex model as the convex model.

4. An object grasping control method comprising:
recognizing, using a processor, at least one of a shape, position, and orientation of each of the plurality of graspable members using a visual sensor;
generating, using the processor a list of the recognized graspable members;
setting, using the processor, respective second orientation ranges of a grasping unit for grasping each of the plurality of graspable members interfering with other graspable members, based on at least one of the shape, position, and orientation of each of the plurality of graspable members;
selecting, using the processor, as a target graspable member, at least one graspable member for which the set second orientation range is less than a predetermined value;
adding, using the processor, the selected target graspable member to a list of the target graspable members; and
deleting, using the processor, the selected target graspable member from the list of the recognized graspable members.

5. The object grasping control method according to claim 4, further comprising:
setting, using the processor, the respective second orientation ranges by setting a range of motion of each of the plurality of graspable members and the grasping unit using at least one convex model.

6. The object grasping control method according to claim 5, further comprising:
setting, using the processor, the respective second orientation ranges using a circular convex model as the convex model.

7. The object grasping control method according to claim 5, further comprising:
setting, using the processor, the respective second orientation ranges using a spherical convex model as the convex model.

8. An object grasping control apparatus comprising:
at least one processor coupled via a bus to a memory, the processor being programmed to control one or more of:
a recognizing unit configured to recognize at least one of a shape, position, and orientation of each of the plurality of graspable members using a visual sensor;
a generating unit configured to generate a list of the recognized graspable members;
a setting unit configured to set respective first orientation ranges of a grasping unit for grasping each of the plurality of graspable members without interfering with other graspable members, based on at least one of the shape, position, and orientation of each of the plurality of graspable members;
a selecting unit configured to select as a target graspable member, one graspable member for which the set first orientation range is greater than a predetermined value;
an adding unit configured to add the selected target graspable member to a list of the target graspable members; and
a deleting unit configured to delete the selected target graspable member from the list of the recognized graspable members.

9. The object grasping control apparatus according to claim 8, wherein the setting unit sets the respective first orientation ranges by setting a range of motion of each of the plurality of graspable members and the grasping unit using at least one convex model.

10. The object grasping control apparatus according to claim 9, wherein the setting unit sets the respective first orientation ranges using a circular convex model as a convex model that is an element of a range of motion of each of the plurality of graspable members and the grasping unit.

11. An object grasping control apparatus comprising:
at least one processor coupled via a bus to a memory, the processor being programmed to control one or more of:

a recognizing unit configured to recognize at least one of a shape, position, and orientation of each of the plurality of graspable members using a visual sensor;

a generating unit configured to generate a list of the recognized graspable members;

a setting unit configured to set respective second orientation ranges of a grasping unit for grasping each of the plurality of graspable members interfering with other graspable members, based on at least one of the shape, position, and orientation of each of the plurality of graspable members;

a selecting unit configured to select as a target graspable member, at least one graspable member for which the set second orientation range is less than a predetermined value;

an adding unit configured to add the selected target graspable member to a list of the target graspable members; and a deleting unit configured to delete the selected target graspable member from the list of the recognized graspable members.

12. The object grasping control apparatus according to claim 11, wherein the setting unit sets the respective second orientation ranges by setting a range of motion of each of the plurality of graspable members and the grasping unit using at least one convex model.

13. The object grasping control apparatus according to claim 12, wherein the setting unit sets the respective second orientation ranges using a circular convex model as the convex model.

14. The object grasping control apparatus according to claim 12, wherein the setting unit sets the respective second orientation ranges using a spherical convex model as the convex model.

15. The object grasping control method according to claim 1, further comprising:

setting, using the processor, the respective first orientation ranges using a spherical convex model as the convex model.

16. The method according to claim 1, further comprising:

determining, using the processor, whether a plurality of graspable member for which the set orientation range is greater than a predetermined value exist, wherein when the plurality of graspable member for which the set orientation range is greater than a predetermined value exist in determining, selecting, using the processor, a target graspable member based on a difference between an initial orientation of the grasping unit and the orientation of the grasping unit for the respective graspable member candidates.

17. The method according to claim 4, further comprising:

determining, using the processor, whether a plurality of graspable member for which the set orientation range is less than a predetermined value exist;

wherein when the plurality of graspable member for which the set orientation range is less than a predetermined value exist in determining, selecting, using the processor, a target graspable member based on a difference between an initial orientation of the grasping unit and the orientation of the grasping unit for the respective graspable member candidates.

* * * * *